United States Patent
Lessing et al.

[19]

[11] Patent Number: 6,120,706
[45] Date of Patent: Sep. 19, 2000

[54] PROCESS FOR PRODUCING AN AGGREGATE SUITABLE FOR INCLUSION INTO A RADIATION SHIELDING PRODUCT

[75] Inventors: Paul A. Lessing; Peter C. Kong, both of Idaho Falls, Id.

[73] Assignee: Bechtel BWXT Idaho, LLC, Idaho Falls, Id.

[21] Appl. No.: 09/030,614

[22] Filed: Feb. 27, 1998

[51] Int. Cl.$^7$ ............................ A62D 31/00; C01G 56/00
[52] U.S. Cl. ................................ 252/478; 423/3; 423/19
[58] Field of Search .............................. 252/478; 423/19, 423/3

[56] References Cited

U.S. PATENT DOCUMENTS

| | | | |
|---|---|---|---|
| 3,331,666 | 7/1967 | Robinson | 423/19 |
| 3,447,938 | 6/1969 | Vassilevsky | 106/105 |
| 4,023,992 | 5/1977 | Ross | 148/132 |
| 4,123,392 | 10/1978 | Hall et al. | 252/478 |
| 4,199,404 | 4/1980 | Mordarski et al. | 176/66 |
| 4,594,513 | 6/1986 | Fleischer et al. | 252/301.1 |
| 4,649,018 | 3/1987 | Waltersdorf et al. | 376/272 |
| 4,687,614 | 8/1987 | Suzuki et al. | 264/40.1 |
| 4,720,370 | 1/1988 | Travelli | 376/422 |
| 4,780,269 | 10/1988 | Fischer et al. | 376/272 |
| 4,812,166 | 3/1989 | Saiki et al. | 75/0.5 C |
| 4,868,400 | 9/1989 | Barnhart et al. | 250/506.1 |
| 4,869,866 | 9/1989 | Lay et al. | 376/421 |
| 4,869,867 | 9/1989 | Lay et al. | 376/241 |
| 4,997,477 | 3/1991 | Kuk et al. | 75/338 |
| 5,156,804 | 10/1992 | Halverson et al. | 376/419 |
| 5,334,847 | 8/1994 | Kronberg | 250/506.1 |
| 5,402,455 | 3/1995 | Angelo, II et al. | 376/272 |
| 5,786,611 | 7/1998 | Quapp et al. | 252/478 |

FOREIGN PATENT DOCUMENTS 61-091598  5/1986  Japan.

OTHER PUBLICATIONS

Kingery, W. D., et al., *Introduction to Ceramics*, (2nd) pp. 290–501., (no date available).

Van Vlack, L. H., *Physical Ceramics for Engineers*, pp. 264–271., (no date available).

*Primary Examiner*—Philip Tucker
*Attorney, Agent, or Firm*—Workman Nydegger & Seeley

[57] ABSTRACT

The present invention is directed to methods for converting depleted uranium hexafluoride to a stable depleted uranium silicide in a one-step reaction. Uranium silicide provides a stable aggregate material that can be added to concrete to increase the density of the concrete and, consequently, shield gamma radiation. As used herein, the term "uranium silicide" is defined as a compound generically having the formula $U_xSi_y$, wherein the x represents the molecules of uranium and the y represent the molecules of silicon. In accordance with the present invention, uranium hexafluoride is converted to a uranium silicide by contacting the uranium hexafluoride with a silicon-containing material at a temperature in a range between about 1450° C. and about 1750° C. The stable depleted uranium silicide is included as an aggregate in a radiation shielding product, such as a concrete product.

26 Claims, 4 Drawing Sheets

PROCESS FOR PRODUCING AN AGGREGATE SUITABLE FOR INCLUSION INTO A RADIATION SHIELDING PRODUCT

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention is directed to the field of radiation shielding for radioactive materials. More particularly, the present invention is directed to a process for producing an aggregate suitable for inclusion into a radiation shielding material.

2. Relevant Technology

With the continuous increase in the amounts of various radioactive materials generated from nuclear power plants and other nuclear facilities, substantial efforts are being made to develop safe and economical ways to store and dispose of radioactive materials. A significant portion of the efforts that have been made are directed to radiation shielding having improved radiation shielding compositions for containers, containment systems and the like, wherein the radioactive materials are contained over extended periods of time.

Radioactive materials, including liquids from reprocessing and spent nuclear fuel, typically have half-lives of hundreds of thousands of years. These radioactive materials are generally stored as a liquid, then solidified, permanently stored, and disposed of as required. For instance, spent nuclear fuel is initially stored in water-cooled pools at reactor sites and subsequently moved to dry storage containers until such time that permanent disposal facilities become available.

In order to protect the human body, machines, and tools from the harmful influences of radiation from radioactive materials, radiation shielding means are prepared having both gamma radiation and neutron shielding characteristics. One material commonly used in radiation shielding is concrete. Concrete is widely used because of its solid structure, low cost and workability.

Shielding efficiency increases as the specific gravity of the radiation shielding means increases. Hence, concrete having a high specific gravity is preferred. However, radiation shielding formed from concrete alone must be extremely thick to provide adequate shielding for radioactive materials. In fact, concrete radiation shielding systems require such a great thickness that these systems generally lack portability due to their high mass and substantial bulk. In addition, this thickness limits the volume of the radioactive material that can be stored in the system because of the space required.

Yoshihisa et al., Japanese Patent Application Pub. No. 61-091598, teaches that shielding characteristics of radiation shielding formed from concrete can be improved by adding depleted uranium metal or uranium oxides to concrete mixtures. Unfortunately, efforts to utilize depleted uranium compounds have been largely unsuccessful, due in part to the chemical reactivity of many of the depleted uranium compounds. For example, the mixed depleted uranium or uranium oxide compounds frequently undergo reactions in the concrete that result in the degradation of the concrete, which may prevent the concrete mixture from obtaining the desired system life of one hundred years, particularly at elevated temperatures.

For depleted uranium to be useful as a suitable aggregate for radiation shielding, the depleted uranium aggregate must not be chemically reactive to its environment. Furthermore, the depleted uranium must have a chemical composition optimized with respect to density, microstructure (fine grained with a minimum of large porosity), leach resistance, and neutron and gamma ray attenuation. Likewise, it is equally important that the uranium aggregate be produced at a low enough cost to allow the concrete mixture containing the uranium aggregate to be viable for disposal or to fabricate shielding structures such as storage casks for spent nuclear fuel.

More recently, in an attempt to produce a stable depleted uranium aggregate having the desired parameters at a low cost, researchers at the Idaho National Engineering & Environmental Laboratory (INEEL) have developed methods for producing high-density aggregates for concrete primarily consisting of depleted uranium oxide. The INEEL method takes a finely divided powder consisting of uranium oxide and increases its packed density by pressing, followed by liquid phase sintering at elevated temperatures. The dense stabilized uranium oxide aggregate is then added to concrete to form a concrete mixture having a higher density to be used for radiation shielding purposes. The cost of fabricating spent nuclear fuel storage casks for uranium oxide aggregates is comparable to those for conventional concrete when using an estimate of \$2.20/kg-U (\$1.00/lb-U) for converting powdered $UO_3$ or $U_3O_8$ into dense $UO_2$ aggregate and \$0.12/kg-U for fabricating the concrete containing the uranium oxide aggregate into a cylindrical storage cask. Hence, this process for forming useful aggregates from uranium oxides is very useful for the efficient disposal of uranium oxide. A problem, however, is that the Department of Energy currently has about 555,000 metric tons of uranium hexafluoride in need of disposal. In comparison, the Department of Energy currently has only about 20,000 metric tons of uranium oxide in need of disposal. Presently, there is no known process for economically converting uranium hexafluoride directly into a stable aggregate for addition to concrete radiation shielding.

One possibility of disposing of the uranium hexafluoride is to convert the uranium hexafluoride into uranium oxide and then form a dense uranium oxide aggregate as referred to in the INEEL method above. However, to use the presently used process of forming dense uranium oxide aggregates for addition to concrete mixtures requires the depleted uranium hexafluoride to be first converted to a uranium oxide. The expense of converting the uranium hexafluoride into uranium oxide, however, is estimated at \$4.20/kg-U (\$1.91/lb-U). Hence, with the additional expense of converting the uranium hexafluoride into a suitable uranium oxide aggregate, the cost of the radiation shielding concrete admixture is estimated at about \$6.40/kg-U, which is expensive.

In view of the above, it is readily apparent that it would be a significant advancement in the art to provide a cost effective process for converting uranium hexafluoride directly into a stable aggregate for addition to a concrete admixture. More specifically, it would be a significant advancement to provide a one-step process for converting uranium hexafluoride into a suitable aggregate for addition to a concrete admixture.

SUMMARY AND OBJECTS OF THE INVENTION

It is, therefore, an object of the present invention to provide an inexpensive process for converting uranium hexafluoride into a suitable aggregate for use in a radiation shielding product.

It is another object of the present invention to provide a one-step method for converting uranium hexafluoride to a suitable aggregate for use in a radiation shielding product.

It is also an object of the present invention to provide an improved process for preparing an inexpensive radiation shielding product.

To achieve the foregoing objects, and in accordance with the invention as embodied and broadly described herein, the present invention is directed to methods for converting depleted uranium hexafluoride to a stable depleted uranium silicide in a one-step reaction. Uranium silicide provides a stable aggregate material that can be added to concrete to increase the density of the concrete and, consequently, shield gamma radiation. As used herein, the term "uranium silicide" is defined as a compound generically having the formula $U_xSi_y$, wherein the x represents the atoms of uranium and the y represent the atoms of silicon.

In accordance with the present invention, uranium hexafluoride is converted to a uranium silicide by contacting the uranium hexafluoride with a silicon containing material at a temperature in a range between about 1000° C. and about 2000° C. More specifically, the uranium hexafluoride and the silicon containing material are contacted by bubbling a uranium hexafluoride gas through a silicon metal in either its molten state or in its gaseous state. Depending on the reaction variables, such as the molar ratio of the uranium hexafluoride to the reacting silicon atoms, the types of silicon metal used, and the reaction temperature, a stable depleted uranium silicide such as $U_3Si$, $U_3Si_2$, $USi$, $U_2Si_3$, $USi_2$, and $USi_3$, is formed.

The stable depleted uranium silicide is included as an aggregate in a radiation shielding product, such as a concrete product. The stabilized depleted uranium silicide aggregate and a neutron absorbing component are present in sufficient amounts to provide a radiation shielding product having a density between about 4 grams per cm$^3$ and about 15 grams per cm$^3$ At a predetermined thickness the radiation shielding product attenuates gamma rays and absorbs neutrons from a radioactive material over a determined time. The stabilized depleted uranium silicide aggregate is stabilized such that degradation of the radiation shielding product is prevented at a temperature of 250° C. for a period of at least one month when in an environment that would be saturated with water vapor at room temperature.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
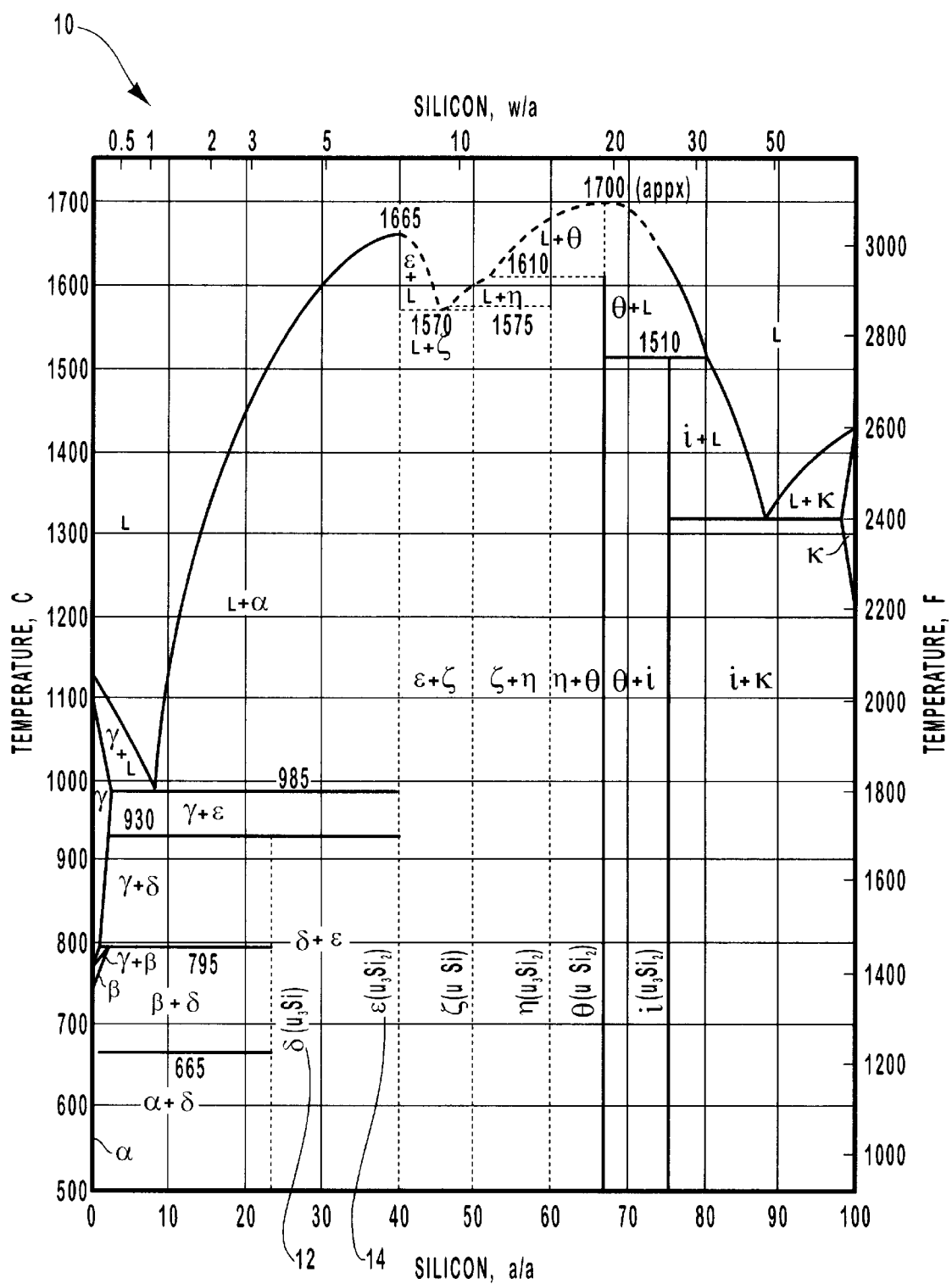
FIG. 1 illustrates a phase diagram of a uranium silicide ($U_xSi_y$) system of the present invention.

The present invention is directed to a method for converting uranium hexafluoride into an aggregate suitable for inclusion into a radiation shielding product.

The department of energy currently has about 555,000 metric tons of uranium hexafluoride in need of disposal. One option for the disposal of the uranium hexafluoride is to convert it to a uranium oxide powder and then further convert the uranium oxide powder to a high density aggregate, similar to an "artificial rock" for use in a shielding material. The shielding material is then used to encase radioactive material, such as spent nuclear fuel. One problem, however, with the disposal of uranium hexafluoride by conversion to a uranium oxide is the high expense incurred in the multi-step process.

It is, therefore, a feature the present invention to provide a one-step method for converting uranium hexafluoride to a suitable aggregate material for inclusion into radiation shielding material. More specifically, it is a feature of the present invention to provide a one-step method of converting uranium hexafluoride into a stabilized depleted uranium silicide material for use as an aggregate in radiation shielding products.

The term "uranium silicide" as defined in the present invention is a compound having the general formula $U_xSi_y$, wherein x represents the atoms of uranium and y represents the atoms of silicon. Examples of uranium silicides in accordance with the present invention include $U_3Si$, $U_3Si_2$, $USi$, $U_2Si_3$, $USi_2$, and $USi_3$. Uranium silicides are also generically referred to herein as "stabilized depleted uranium." Stabilized depleted uranium suicides, in accordance with the present invention, preferably do not substantially degrade at a temperature between about 90° C. and 250° C., and more preferably at 250° C., for a period of at least one month when in an environment that is saturated in water vapor at room temperature.

The "shielding material" or "radiation shielding material" as used herein is a material such as concrete, ceramic, bituminous material, metal composite, polymer cement, polymer glass, or water containing a stabilized depleted uranium silicide material and used for shielding radioactive materials. The shielding material can be for use in containers, structures and other objects.

Stabilized depleted uranium silicides in accordance with the present invention are prepared by contacting a gaseous uranium hexafluoride or a uranium hexafluoride and hydrogen gas mixture through a molten or gaseous silicon-containing material. The reaction is preferably performed at a temperature in a range between about 1000° C. and about 2000° C., more preferably between about 1410° C. and about 1750° C., and most preferably between about 1450° C. and about 1750° C. It should, however, be noted that when molten silicon-containing materials are used, it is important that the reaction temperature is above the melting point of the silicon-containing material. Likewise, when a gaseous silicon-containing material is used in the present invention, it is important that the reaction temperature is sufficient to maintain the gaseous nature of the silicon-containing material. Reactions (1) through (7) provide examples of one-step methods for converting uranium hexafluoride to uranium silicide compounds:

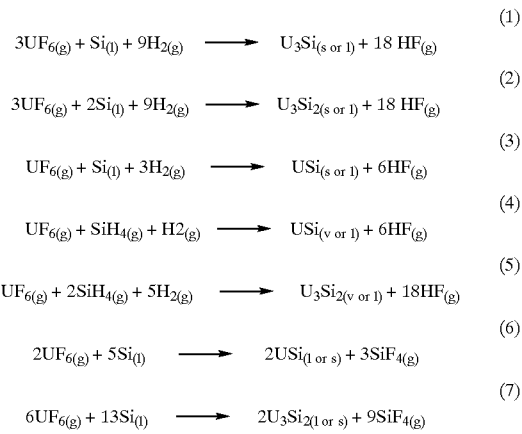

$$3UF_{6(g)} + Si_{(l)} + 9H_{2(g)} \longrightarrow U_3Si_{(s\ or\ l)} + 18\ HF_{(g)} \quad (1)$$

$$3UF_{6(g)} + 2Si_{(l)} + 9H_{2(g)} \longrightarrow U_3Si_{2(s\ or\ l)} + 18\ HF_{(g)} \quad (2)$$

$$UF_{6(g)} + Si_{(l)} + 3H_{2(g)} \longrightarrow USi_{(s\ or\ l)} + 6HF_{(g)} \quad (3)$$

$$UF_{6(g)} + SiH_{4(g)} + H2_{(g)} \longrightarrow USi_{(v\ or\ l)} + 6HF_{(g)} \quad (4)$$

$$3UF_{6(g)} + 2SiH_{4(g)} + 5H_{2(g)} \longrightarrow U_3Si_{2(v\ or\ l)} + 18HF_{(g)} \quad (5)$$

$$2UF_{6(g)} + 5Si_{(l)} \longrightarrow 2USi_{(l\ or\ s)} + 3SiF_{4(g)} \quad (6)$$

$$6UF_{6(g)} + 13Si_{(l)} \longrightarrow 2U_3Si_{2(l\ or\ s)} + 9SiF_{4(g)} \quad (7)$$

The reactions of the type illustrated in reaction equations (1), (2), and (3) involve bubbling a mixture of uranium hexafluoride gas and hydrogen gas through molten silicon. Depending on the operating temperature of the molten silicon bath, the uranium silicide products may be a liquid or a solid. The by-product produced in reaction equations (1), (2), and (3) is a hydrofluoric acid gas which is useful as an industrial chemical feedstock.

Figure 5:
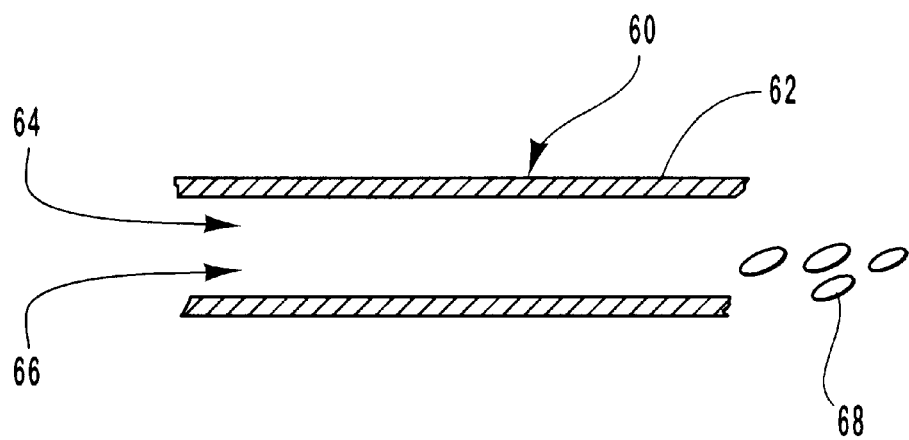
FIG. 5 illustrates a plasma torch for contacting gaseous uranium hexafluoride and gaseous silicon compound.

The reactions of the type illustrated in (4) and (5) involve the use of a gaseous uranium hexafluoride and a gaseous source of silicon, such as silane (SiH$_4$). The use of gaseous uranium hexafluoride and a gaseous silicon source allows for a more intimate mixing of the uranium hexafluoride and the silicon which increases the probability of achieving the desired stoichiometric phase of the uranium silicide and the hydrofluoric acid. As illustrated in FIG. 5, the proper ratio of a uranium hexafluoride gas 64 and silicon-containing feed gases 66 for a particular reaction are mixed into a plasma reactor 60, (using a plasma torch 62) to provide a high reaction temperature. Molten droplets of uranium silicide 68 are formed when the plasma quench rates are low. Alternatively, at higher quench rates fine solid powders of uranium silicide are formed. The uranium silicide is collected and cast from a hot crucible. The uranium silicide casting is then slowly cooled to room temperature to form the stabilized depleted uranium silicide aggregate for inclusion into the shielding material.

The reactions of the type illustrated in (6) and (7) contact a gaseous uranium hexafluoride with a molten silicon metal to form a stabilized depleted uranium silicide. Reactions (6) and (7) are of interest because they require no hydrogen input and produce a silicon tetrafluoride gas by-product which has high commercial value.

Standard free energy calculations indicate that reactions (1)–(7) successfully proceed to form stabilized depleted uranium silicides. For example, according to standard free energy calculations, reaction (1) will proceed above about 1200° C. and have a value of −462.7 kJ/mole at 1700° C. and −668.7 kJ/mole at 2000° C. Standard free energy calculations for reaction (7) indicate that reaction (7) is very favorable at 1000° C. having a value of −2644. kJ/mole. The favorability of reaction (7) is due to the very high negative free energy of formation of the silicon tetrafluoride by-product as compared to hydrofluoric acid. Standard free energy calculations indicate that it is possible to form uranium silicides at temperatures above the melting point of silicon which is 1410° C. In addition, uranium silicides can be formed above the melting point of U$_3$Si$_2$ which is 1665° C. (see Table 1 above). In fact, temperatures above 1700° C. which are higher than the melting point of any of the crystalline phases of uranium silicide (see Table 1). Temperatures above 1700° C. allow homogenization prior to cooling and precipitation of the stoichiometric phases (see FIG. 1).

Figure 4:
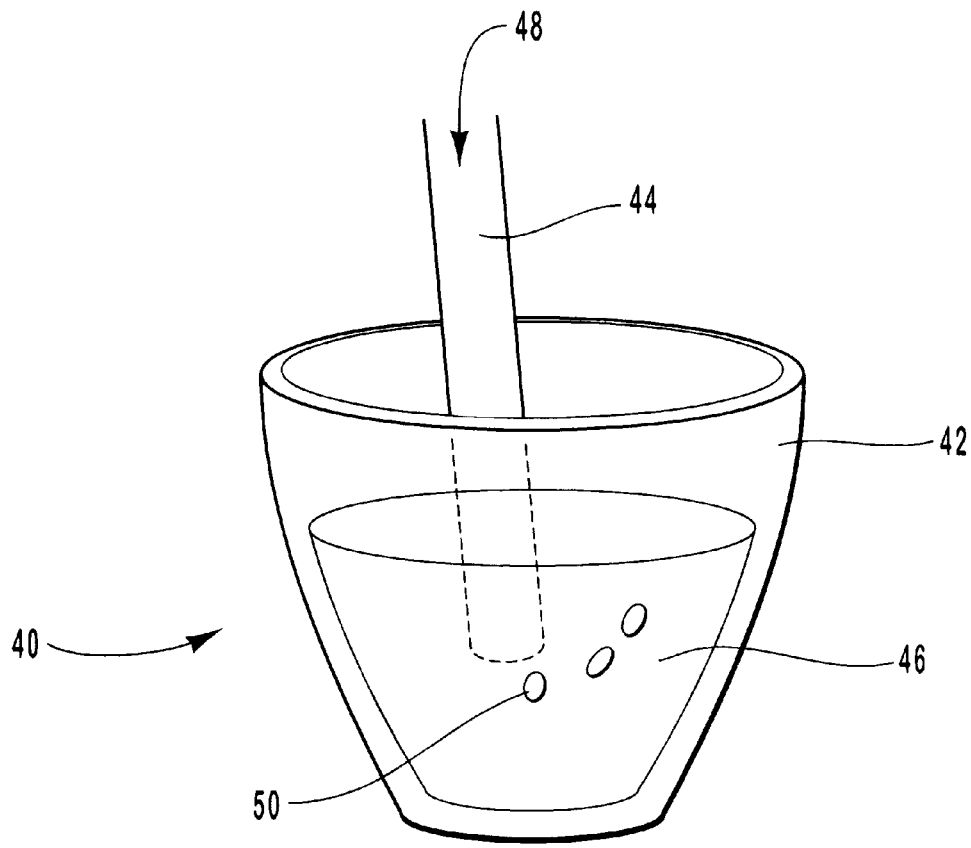
FIG. 4 illustrates a system for bubbling a gaseous uranium hexafluoride through molten silicon.

As illustrated in FIG. 4, the one-step conversion process of uranium hexafluoride to a uranium silicide can be performed in a graphite crucible 42. When performed in graphite crucible 42, a silicon metal containing material is added to crucible 42. Heat is applied to crucible which in turn melts the silicon metal containing material by induction heating to form molten silicon 46. Once silicon is in its molten state 46, a protective silicon carbide layer 24 (FIG. 2) forms between the molten silicon 46 and the graphite crucible 42. A uranium hexafluoride gas 48, or a uranium hexafluoride gas/hydrogen gas mixture, is bubbled through molten silicon 46 so that uranium hexafluoride 48 and silicon 46 are in contact to form a uranium silicide. Uranium hexafluoride gas 48 is preferably bubbled through the silicon source using a graphite tube 44. The unreacted depleted uranium hexafluoride is condensed and separated using a cold trap. This one-step conversion process is preferably conducted under an inert gas atmosphere in a glove box to prevent contamination or disturbance of the reaction.

After cooling, the stabilized depleted uranium silicide material is added to a shielding material, preferably concrete to form a radiation shielding material. The stabilized depleted uranium silicides formed preferably do not substantially degrade at temperatures up to 250° C. for a period of at least one month when in an environment that is saturated in water vapor at room temperature.

The stabilized depleted uranium silicide is then added to a shielding material for attenuating gamma rays. It is understood by a skilled artisan in view of the present invention that the stabilized depleted uranium suicide can be added to any shielding materials including, but not limited to concrete, ceramic, bituminous materials, metal composite, polymer cements, polymer, glass, and water. It is preferred that the shielding material further comprise a substance useful in attenuating and absorbing neutrons. Shielding materials, such as concrete, polymers, polymers cement, waxes and water, have inherent neutron attenuating qualities, an additional benefit when shielding radioactive materials.

Stabilized depleted uranium suicides useful as aggregates in radiation shielding materials preferably have the following properties:

(i) a high mole fraction of uranium atoms (high theoretical density);

(ii) are dense (high percentage of theoretical density);

(iii) are chemically stable (good oxidation and water leach resistance);

(iv) are physically hard and strong structure; and (v) conversion from uranium hexafluoride is inexpensive.

Furthermore, Table 1 illustrates selected properties of uranium silicide phases:

| Phase | Structure | Density (g/cc) | Melting Pt. (° C.) |
|---|---|---|---|
| $U_3Si$ | tetragonal | 15.58 | transforms 765 |
| $U_3Si$ | cubic | — | 930 decomposes |
| $U_3Si_2$ | tetragonal | 12.2 | 1665 |
| USi | o. rhombic | 10.4 | 1575 decomposes |
| $U_2Si_3$ | hexagonal | 9.25 | 1610 decomposes |
| $\alpha$-$USi_2$ | tetragonal | 8.98 | 1700 |
| $USi_3$ | cubic | 8.15 | 1510 decomposes |

FIG. 1 illustrates a phase diagram of a uranium silicide system in accordance with the present invention. As illustrated in the phase diagram in FIG. 1, the $U_3Si$ phase 12 has a high density (15.58 g/cc) when compared to uranium metal (19 g/cc) and uranium oxide (11 g/cc). The $U_3Si_2$ phase 14 has an even higher density (12.2 g/cc) than uranium oxide and is easier to make than the lower temperature $U_3Si$ phase 12. The $U_3Si$ phase is formed below 930° C. by a sluggish peritectoid reaction between uranium and the $U_3Si_2$ phase, as described in Chalder, W. T. Bourns, M. A. Feraday and J. Veeder, "$U_3Si$ as a Nuclear Fuel", AECL-2874, Chalk River Nuclear Laboratories, Chalk River, Ontario. Presented at the Canadian Nuclear Association Meeting, Montreal, May 1967. Furthermore, rods of the $U_3Si$ phase have been produced by vacuum induction melting of uranium and silicon, followed by casting the $U_3Si$ phase into cored rods. The $U_3Si$ phase cored rods are then heat treated at 800° C. to transform the as-cast structure of $U_3Si_2$ into the $U_3Si$ phase (96.2 weight percent uranium and 3.8 weight percent silicon).

Uranium silicides exhibit excellent oxidation resistance at temperatures up to 1800° C. due to the formation of a protective layer of silicon dioxide. For example, $U_3Si$ powders do not oxidize until at least 160° C. and $U_3Si_2$ powders do not oxidize until at least 270° C. In addition, dense pieces of $U_3Si$ have very low corrosion rates, on the order of one to two $mg/cm^2h$ at 343° C. with the addition of 1.5 weight percent aluminum. Furthermore, $U_3Si$ has been considered for application as a reactor fuel.

Figure 2:
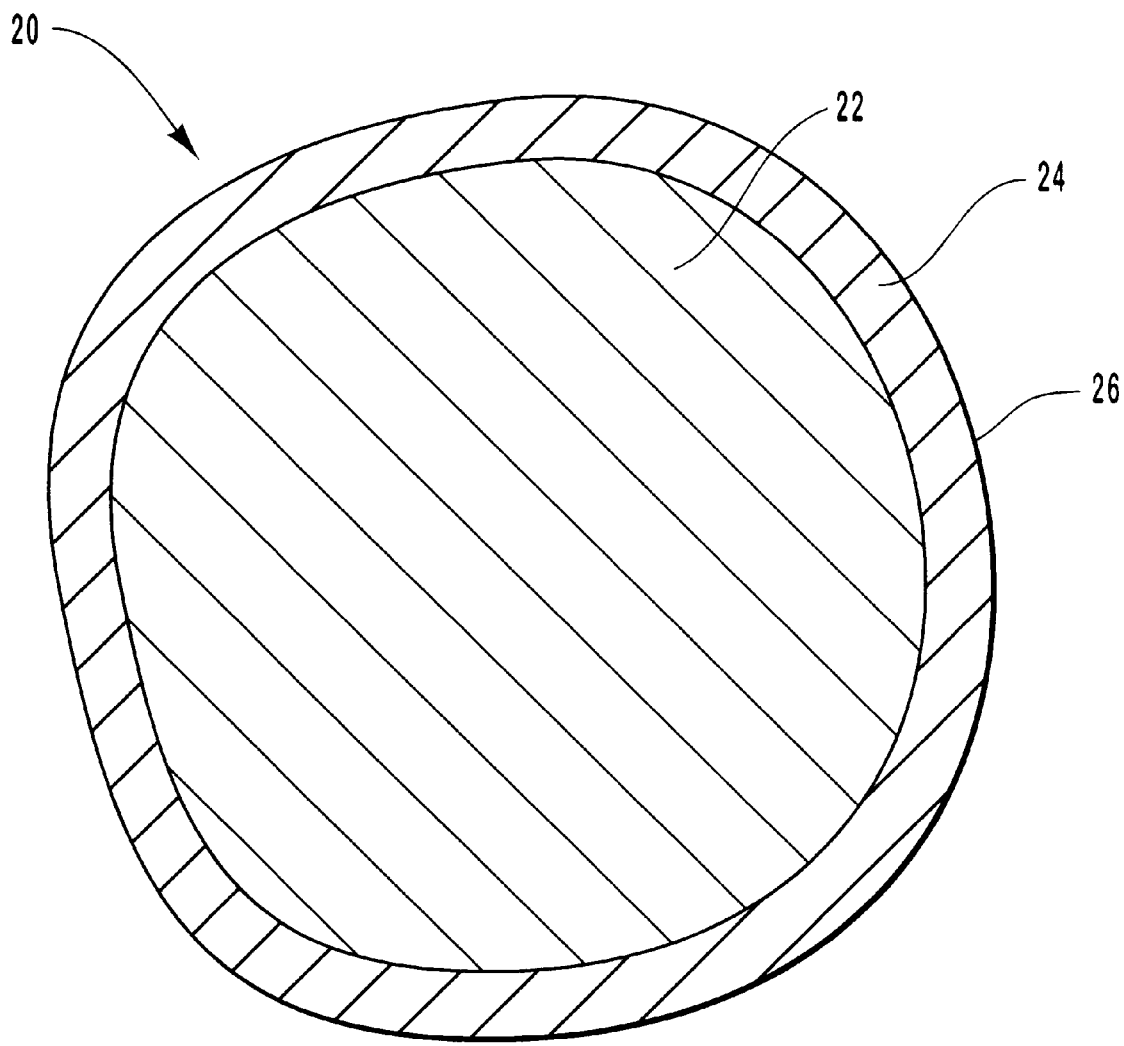
FIG. 2 illustrates an enlarged cross-sectional view of a stabilized depleted uranium silicide made in accordance with the present invention.

FIG. 2 illustrates a stabilized depleted uranium silicide aggregate particle 22 having a stable layer 24 circumferencially disposed thereon. Stable layer 24 has a surface 26 that is water and/or air impermeable prevents undesirable materials from contacting uranium silicide 22. Stable layer 24 is the product of a reaction of depleted uranium silicide and oxygen, such as silicon dioxide. This stable layer is disposed at least at the surface of the uranium silicide particle 22, and possibly deeper into uranium silicide particle 22.

Stable layer 24 can be formed by combining the depleted uranium silicide with an oxygen based oxidizer, such as air, oxygen, or water to form stable layer 24 of amorphous silicon dioxide. Such reactions as may be carried out by those skilled in the art include the following:

where x and y represent the ratio of atoms in the molecule of depleted uranium and silicon, respectively. Those skilled in the art will appreciate in view of the present invention that the above formulae are merely illustrative of the formation of at least stable layer 24, and one skilled in the art will recognize additional methods for forming stable layer 24 for a particle of uranium silicide 22.

Figure 3:
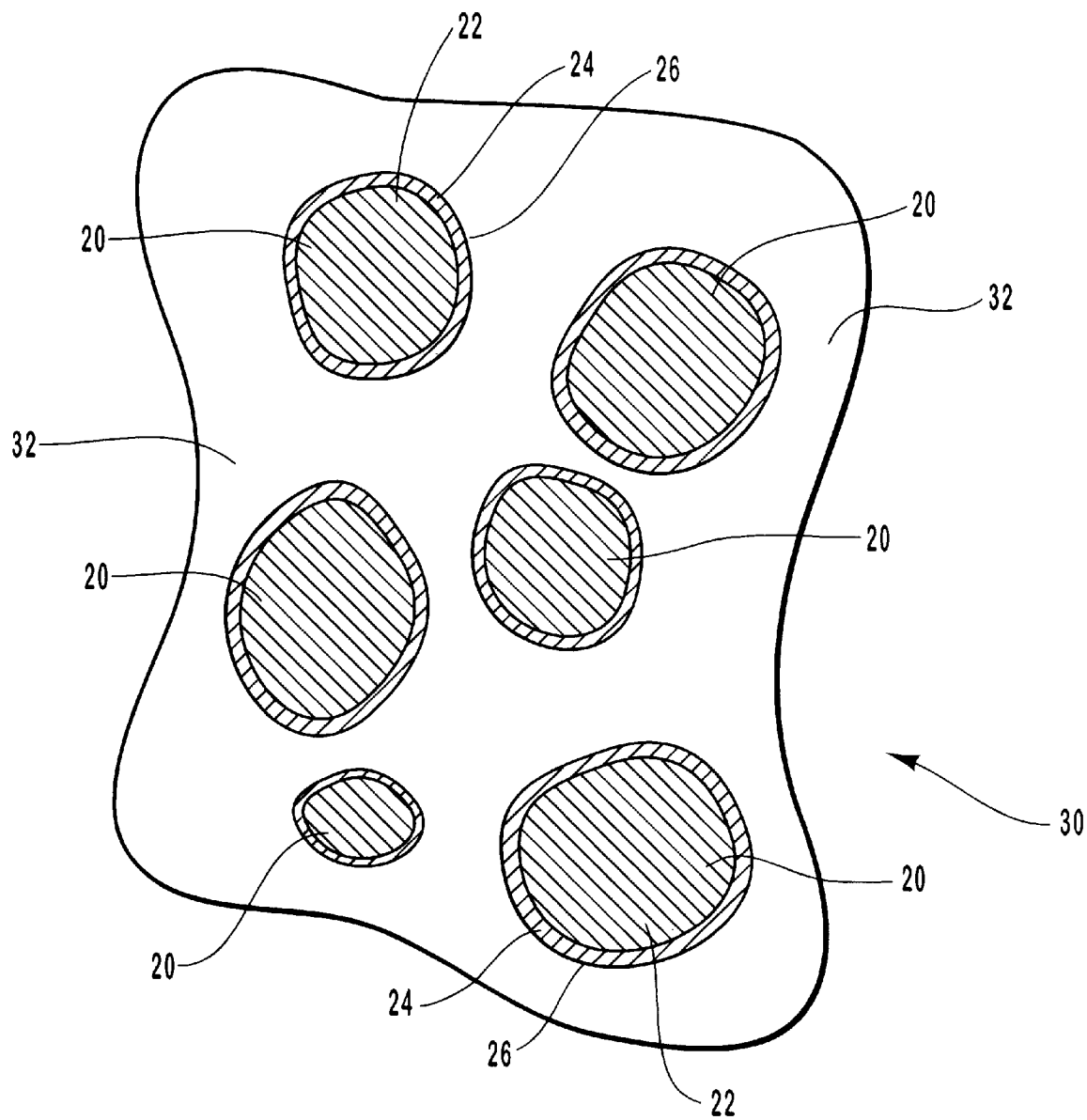
FIG. 3 illustrates an enlarged cross-sectional view of a radiation shielding concrete product containing a stabilized depleted uranium silicide as an aggregate.

The reaction forming stable layer 24 on particle of uranium silicide 22 can occur before, at the time of, or after the inclusion of the depleted uranium silicide in a shielding material 32, as shown in FIG. 3; providing the inclusion of depleted uranium silicide compound particle 22 in the shielding material does not substantially reduce the structural integrity of the shielding material or uranium silicide particle 22.

The stabilized depleted uranium silicides aggregates of the present invention are not necessarily of any particular shape, and their cross-sectional diameters can vary substantially from one particle to another. Uranium silicide particle 22 illustrated in FIG. 1, generally has a size in the range from approximately $5 \times 10^{-7}$ meters to $5 \times 10^{-2}$ meters, with a preferred particle size in the range from approximately $1 \times 10-3$ meters to $7 \times 10^{-2}$ meters. Uranium silicides can react with oxygen, water or a similar oxidizing reagent to form at least a stable layer 24 of silicon dioxide ($SiO_2$) on the uranium silicide particle 22.

It is appreciated by one of ordinary skill in the art in view of the present invention, that the depleted uranium silicide aggregate may comprise two or more uranium silicide particles grouped or disposed substantially close together to form at least one stable aggregate of depleted uranium silicide which is substantially dense. The grouping, fusing or sintering of the depleted uranium silicide aggregates is more fully disclosed in PCT International Publication Number WO 96/23310 entitled "Stabilized Uranium Material," which is hereby incorporated by reference.

By way of further example, a stabilized depleted uranium silicide incorporated into a concrete shielding material is illustrated.

Concrete having a depleted uranium silicide aggregate is produced by conventional means. Mix proportions for conventional heavy aggregate concretes are similar to those used for construction concretes. Such mix proportions are also suitable for use with the depleted uranium silicide aggregates. Mixed proportions are one part cement, two parts sand, and four parts course aggregate by weight, with about 5.5 to 6 gallons of water per 94-lb. bag of cement. Ordinary portland cement (Portland Type I–II) is used. The water/cement ratio (which could effect neutron absorbtion) is selected to maximize the concrete strength. Stabilized depleted uranium silicide aggregates have a stable layer surrounding them, that is water and air impermeable and stable at elevated temperatures. Heavy mineral fines, such as barite or magnetite sands, are used as a replacement for sand if further increases in concrete density are desired. Neutron absorbing additives such as boron compounds, (i.e., boron carbide, boron frits, boron-containing glass or $B_2O_3$); hafnium compounds, (i.e., $HfO_2$); or gadolinium compounds, (i.e., $Gd_2O_3$) are also added as needed.

The concrete shielding composition of this invention preferably contains reinforcing materials, such as steel bars, necessary to meet structural requirements for accidents and seismic events, reinforcing fillers and/or strengthening impregnants. These materials include steel fiber, glass fiber, polymer fiber, lath and reinforcing steel mesh.

A uranium suicide aggregate concrete, using typical standard mix proportions, has a density of between about 4 $g/cm^3$ and about 15 $g/cm^3$, depending on the density of the uranium silicide aggregate and whether silica sand or barite sand is used.

Depleted uranium silicide concrete has a much higher density than conventional heavy aggregate concretes or construction concretes. Since the shielding advantage for gamma radiation is approximately proportional to the density of the concrete, a unit thickness of depleted uranium silicide concrete provides an average of one and one-half times the shielding of conventional heavy aggregate concrete and two times that for construction concrete. Heavy aggregate concrete, as used herein, contains barite, magnetite or limonite as a replacement for conventional gravel aggregate.

The improved shielding performance of uranium silicide aggregate concrete provides significant container weight and space savings. Also by converting the uranium hexafluoride into a suitable aggregate in a one-step method, the costs of converting the uranium hexafluoride into uranium oxide are avoided.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

We claim:

1. A method for preparing a stabilized uranium silicide for use as an aggregate in concrete shielding materials, the method comprising the steps of:
   providing a uranium hexafluoride;
   contacting the uranium hexafluoride with a silicon-containing material at a temperature in a range between about 1000° C. to about 2000° C. to form a stabilized uranium silicide, wherein the uranium hexafluoride is in a gaseous state and the silicon-containing material is in a molten state, and wherein the uranium hexafluoride is contacted
   with the silicon-containing material by bubbling the gaseous uranium hexafluoride through the molten silicon to form a stabilized uranium silicide.

2. A method for preparing a stabilized uranium silicide for use as an aggregate in concrete shielding materials, the method comprising the steps of:
   providing a uranium hexafluoride;
   contacting the uranium hexafluoride with a silicon-containing material at a temperature in a range between about 1410° C. to about 1750° C. to form a stabilized uranium silicide.

3. A method for preparing a stabilized uranium silicide for use as an aggregate in concrete shielding materials, the method comprising the steps of:
   providing a uranium hexafluoride;
   contacting the uranium hexafluoride with a silicon-containing material at a temperature in a range between about 1000° C. to about 2000° C. to form a stabilized uranium silicide, wherein the uranium hexafluoride is in a gaseous state and the silicon-containing material is in a gaseous state, and wherein contacting is performed by mixing the gaseous uranium hexafluoride and the gaseous silicon-containing material in a plasma torch apparatus to form the stabilized uranium hexafluoride.

4. A method for preparing a stabilized uranium silicide for use as an aggregate in concrete shielding materials, the method comprising the steps of:
   providing a uranium hexafluoride;
   contacting the uranium hexafluoride with a silicon-containing material at a temperature in a range between about 1000° C. to about 2000° C. to form a stabilized uranium silicide, further comprising forming a stable layer of material around the uranium silicide.

5. A method for preparing a stabilized uranium silicide as recited in claim 1, wherein the stabilized uranium silicide is further added to a concrete mixture to form a radiation shielding concrete product.

6. A method for preparing a stabilized uranium silicide as recited in claim 2, wherein the silicon-containing material is in a gaseous state and the uranium hexafluoride is contacted with the silicon-containing material by mixing the uranium hexafluoride with a gaseous silicon-containing material.

7. A method for preparing a stabilized uranium silicide as recited in claim 1 wherein the uranium hexafluoride is contacted with the silicon-containing material in an inert atmosphere.

8. A method for preparing a stabilized uranium silicide as recited in claim 1, wherein the uranium silicide formed is selected from the group consisting of $U_3Si$, $U_3Si_2$, $USi$, $U_2Si_3$, $USi_2$, and $USi_3$.

9. A method for preparing a stabilized uranium silicide as recited in claim 1, wherein the stabilized uranium silicide does not degrade at a temperature between 90° C. and 250° C. for a period of at least one month when in an environment that is saturated with water vapor at room temperature.

10. A method for preparing a stabilized uranium silicide as recited in claim 3, wherein the uranium hexafluoride and the silicon-containing material are contacted in an inert gas environment.

11. A method for preparing a stabilized uranium silicide as recited in claim 4, wherein the stable layer of material around the uranium silicide is silicon dioxide, metal, polymer, or glass.

12. A method for preparing a stabilized uranium silicide, the method comprising the steps of:
   providing a gaseous uranium hexafluoride material;
   providing a molten silicon-containing material;
   bubbling the uranium hexafluoride through the molten silicon-containing material to form a uranium silicide; and
   cooling the uranium silicide to form a solid stabilized uranium silicide aggregate material.

13. A method for preparing a stabilized uranium silicide, the method comprising the steps of:
   providing a gaseous uranium hexafluoride;
   providing a gaseous silicon-containing material;
   contacting the gaseous uranium hexafluoride and the gaseous silicon-containing material in a plasma torch to form a stabilized uranium silicide aggregate.

14. A method for preparing a stabilized uranium silicide as recited in claim 13, wherein the gaseous silicon-containing material is silane.

15. A method for preparing a radiation shielding product having a stabilized uranium silicide aggregate, the method comprising the steps of:
   contacting a uranium hexafluoride with a silicon-containing material at a high temperature to form a stabilized uranium silicide aggregate;
   combining the stabilized uranium silicide aggregate with a shielding material to form a radiation shielding material, wherein the uranium hexafluoride is in a gaseous state and the silicon-containing material is in a molten state, and wherein contacting the uranium hexafluoride with the silicon-containing material is performed by bubbling the uranium hexafluoride gas through the molten silicon-containing material.

16. A method for preparing a radiation shielding product having a stabilized uranium silicide aggregate as recited in claim 15, wherein the radiation shielding product has a density between about 4 grams per cm$^3$ and about 15 grams per cm$^3$.

17. A method for preparing a radiation shielding product having a stabilize uranium silicide aggregate as recited in claim 15, wherein the radiation shielding material is selected from the group consisting of concrete, ceramic, bituminous materials, metal composite, polymer cement, polymer, glass, and water.

18. A method for preparing a radiation shielding product having a stabilized uranium silicide aggregate as recited in claim 15, wherein the radiation shielding material is a concrete material.

19. A method for preparing a radiation shielding product having a stabilized uranium silicide aggregate, the method comprising the steps of:

contacting a uranium hexafluoride with a silicon-containing material at a high temperature to form a stabilized uranium silicide aggregate;

combining the stabilized uranium silicide aggregate with a shielding material to form a radiation shielding material, wherein the uranium hexafluoride is in a gaseous state and the silicon-containing material is in a gaseous state, and wherein the contacting step is performed by mixing the gaseous uranium hexafluoride and the gaseous silicon-containing material in a plasma torch apparatus to form the stabilized uranium hexafluoride.

20. A method for preparing a stabilized uranium silicide as recited in claim 2, wherein the uranium silicide formed is selected from the group consisting of $U_3Si$, $U_3Si_2$, $USi$, $U_2Si_3$, $USi_2$, and $USi_3$.

21. A method for preparing a stabilized uranium silicide as recited in claim 3, wherein the uranium silicide formed is selected from the group consisting of $U_3Si$, $U_3Si_2$, $USi$, $U_2Si_3$, $USi_2$, and $USi_3$.

22. A method for preparing a stabilized uranium silicide as recited in claim 4, wherein the uranium silicide formed is selected from the group consisting of $U_3Si$, $U_3Si_2$, $USi$, $U_2Si_3$, $USi_2$, and $USi_3$.

23. A method for preparing a radiation shielding product having a stabilized uranium silicide aggregate as recited in claim 19, wherein the silicon-containing material is silane.

24. A method for preparing a radiation shielding product having a stabilized uranium silicide aggregate as recited in claim 19, wherein the radiation shielding product has a density between about 4 grams per cm$^3$ and about 15 grams per cm$^3$.

25. A method for preparing a radiation shielding product having a stabilized uranium silicide aggregate as recited in claim 19, wherein the radiation shielding material is selected from the group consisting of concrete, ceramic, bituminous materials, metal composite, polymer cement, polymer, glass, and water.

26. A method for preparing a radiation shielding product having a stabilized uranium silicide aggregate as recited in claim 19, wherein the radiation shielding material is a concrete material.

* * * * *